(12) United States Patent
Berger et al.

(10) Patent No.: US 8,250,243 B2
(45) Date of Patent: Aug. 21, 2012

(54) DIAGNOSTIC DATA COLLECTION AND STORAGE PUT-AWAY STATION IN A MULTIPROCESSOR SYSTEM

(75) Inventors: Deanna Postles Dunn Berger, S Hyde Park, NY (US); Ekaterina M. Ambroladze, Wappingers Falls, NY (US); Michael Fee, Cold Spring, NY (US); Christine C. Jones, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 12/822,704

(22) Filed: Jun. 24, 2010

(65) Prior Publication Data

US 2011/0320744 A1 Dec. 29, 2011

(51) Int. Cl.
*G06F 3/00* (2006.01)
(52) U.S. Cl. ..................... 710/7; 710/5; 714/1
(58) Field of Classification Search .................. None
See application file for complete search history.

(56) References Cited

U.S. PATENT DOCUMENTS

| | | | |
|---|---|---|---|
| 5,361,372 A | | 11/1994 | Rege et al. |
| 5,663,948 A | * | 9/1997 | Kobunaya ..................... 370/229 |
| 7,313,613 B1 | * | 12/2007 | Brooking et al. ............. 709/223 |
| 7,698,604 B2 | * | 4/2010 | Bartlett et al. ................... 714/45 |
| 2004/0210804 A1 | * | 10/2004 | Kimelman et al. ........... 714/724 |
| 2004/0267489 A1 | * | 12/2004 | Reblewski et al. ........... 702/127 |
| 2005/0268177 A1 | * | 12/2005 | John ................................ 714/47 |
| 2007/0220361 A1 | | 9/2007 | Barnum et al. |

FOREIGN PATENT DOCUMENTS

JP 02-96847 A 4/1990

OTHER PUBLICATIONS

Taylor et al., "Anomaly Detection in Concurrent Software by Static Data Flow Analysis," Apr. 1979, IP.com, pp. 1-51.*

* cited by examiner

*Primary Examiner* — Eron J Sorrell
(74) *Attorney, Agent, or Firm* — Cantor Colburn LLP; John Campbell

(57) ABSTRACT

A computer-implemented method for collecting diagnostic data within a multiprocessor system that includes capturing diagnostic data via a plurality of collection points disposed at a source location within the multiprocessor system, routing the captured diagnostic data to a data collection station at the source location, providing a plurality of buffers within the data collection station, and temporarily storing the captured diagnostic data on at least one of the plurality of buffers, and transferring the captured diagnostic data to a target storage location on a same chip as the source location or another storage location on a same node.

27 Claims, 7 Drawing Sheets

SYSTEM

NODE

DIAGNOSTIC DATA COLLECTION AND STORAGE PUT-AWAY STATION IN A MULTIPROCESSOR SYSTEM

BACKGROUND

The present invention relates to improved data processing, and more specifically, to method for minimizing impacts on system performance, and overflow conditions in a diagnostic data collection and storage put-away station in a multiprocessor system.

During the development and subsequent general releases of any complex computing system it is useful for debugging purposes to have an amount of information of certain diagnostic operations being performed by the hardware. One method involves collecting the information in a temporary buffer and storing its final temporary or permanent storage location once enough data is collected to fill an entire data transfer packet (line). The diagnostic data is collected in small portions (e.g., a few bytes at a time) such that many of the small data captures must be made before an entire line is accumulated. There are several problems with the current method such as that once the temporary buffer is filled no further data can be captured until the buffer has been read. Using a buffer with a separate read and write interface can alleviate some of this delay, but the majority of the wait time tends to be incurred while waiting for the downstream interfaces and other resources to be available to transfer the line to a target storage location. Another problem with diagnostic data collection in large systems with shared multi-level cache hierarchies is that the capture and put-away of the desired data requires a significant usage of the high bandwidth system fabric busses in order to transfer the data from the various collection points to physical memory where it can be later accessed by software. Often the putting away of the data from certain collection points can alter the information collected at other collection points.

SUMMARY

According to an embodiment of the present invention, a computer-implemented method is provided for collecting diagnostic data within a multiprocessor system. The computer-implemented method includes capturing diagnostic data via a plurality of collection points disposed at a source location within the multiprocessor system, routing the captured diagnostic data to a data collection station at the source location, providing a plurality of buffers within the data collection station, and temporarily storing the captured diagnostic data on at least one of the plurality of buffers, and transferring the captured diagnostic data to a target storage location on a same chip as the source location or another storage location on a same node.

A computer-program product and system for performing the above-mentioned method are also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention disclose a method for capturing diagnostic data which is information about types of commands, for example, that are flowing across specific interfaces and storing the data in main memory without affecting system performance. That is, without using the major fabric buses of the system, for example.

Figure 1:
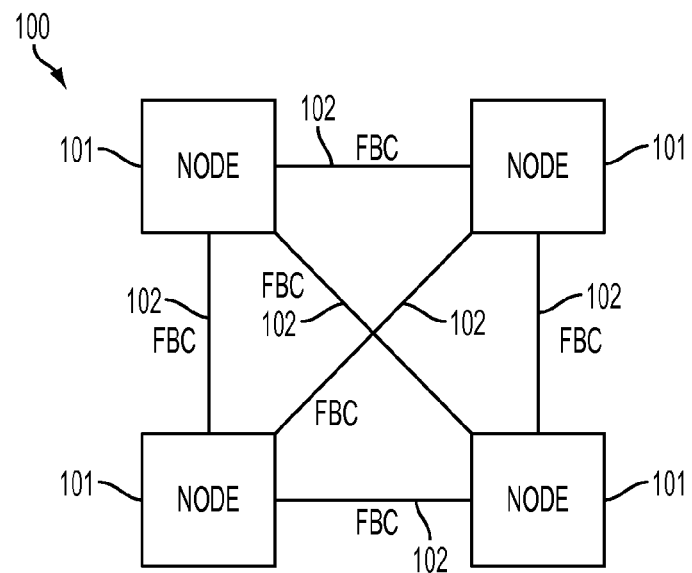
FIG. 1 is a diagram illustrating a system that can be implemented within an embodiment of the present invention.
Figure 2:
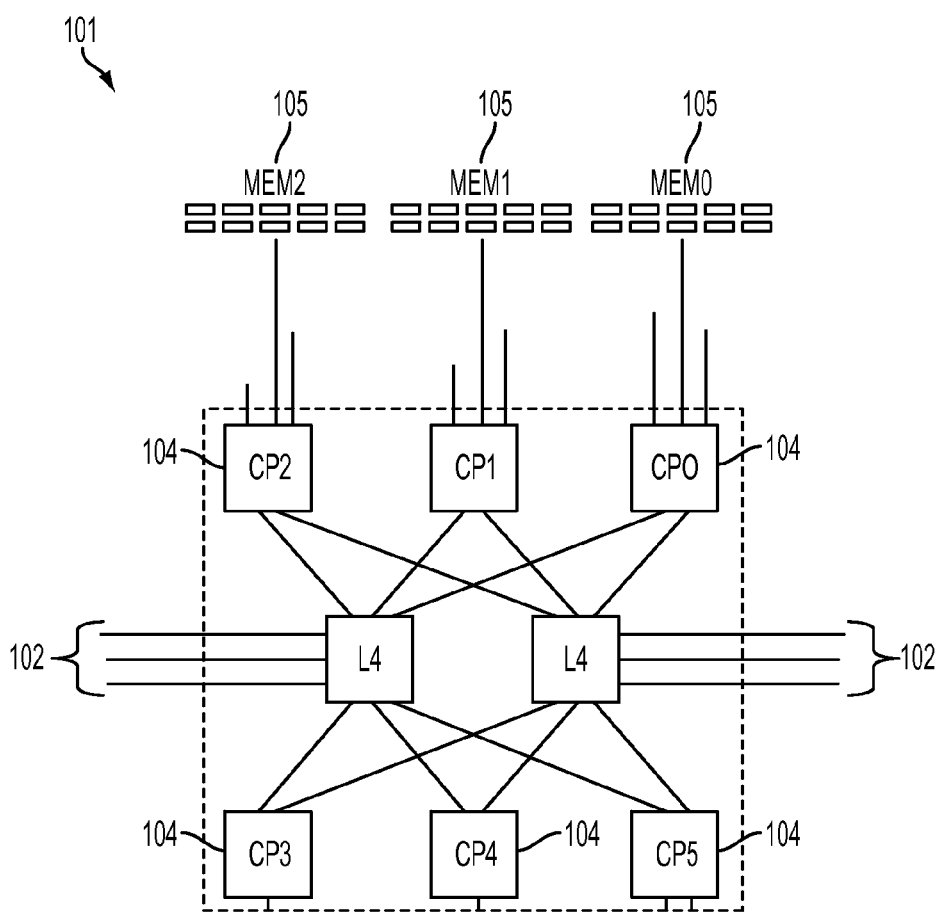
FIG. 2 is a diagram illustrating a node of the system that can be implemented within embodiments of the present invention.

FIG. 1 is a diagram illustrating a system that can be implemented within an embodiment of the present invention. The system 100 has a plurality of nodes 101 connected together and communicating via fabric buses 102. FIG. 2 is a diagram illustrating a node of the system that can be implemented within embodiments of the present invention. As shown in FIG. 2, the node 101 includes a plurality of chips 104 and associated memory 105. According to an embodiment of the present invention, diagnostic data captured is stored on an associated memory 105 of a chip itself or in another memory location on the node 104. Additional details regarding capturing and storing of the diagnostic data will now be discussed below with reference to FIG. 3.

Figure 3:
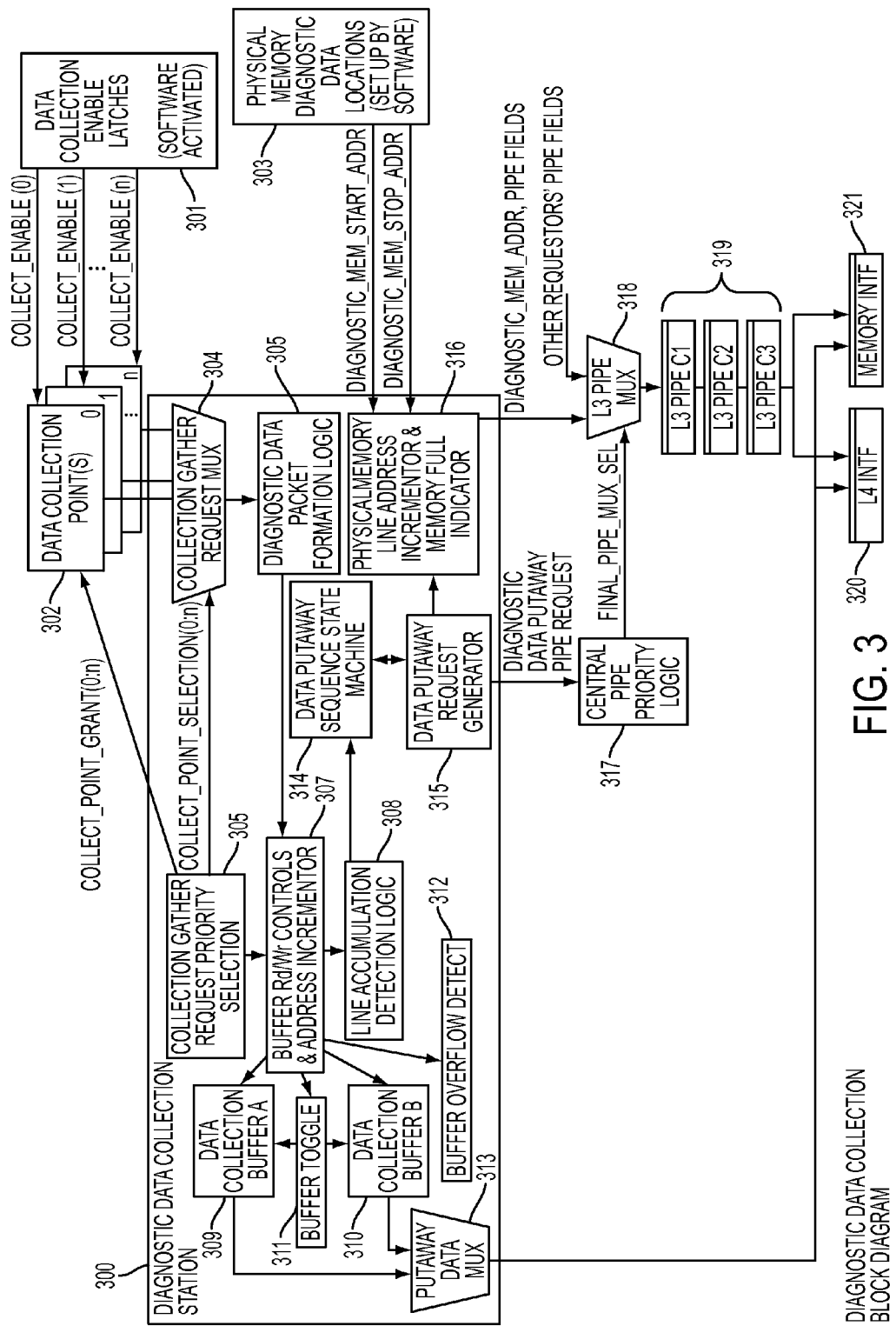
FIG. 3 is a block diagram illustrating a diagnostic data collection station that can be implemented within embodiments of the present invention.

FIG. 3 is a block diagram illustrating a diagnostic data collection station that can be implemented within embodiments of the present invention. As shown in FIG. 3, a diagnostic data collection station 300 is provided. The diagnostic data collection station 300 includes a collection gathering request multiplexer 304, diagnostic data packet formation logic 305, a collection gather request priority selector 306, a buffer read/write controls and address incrementor 307, and line accumulation detection logic 308. The diagnostic data collection station 300 further includes a first data collection buffer 309 and a second data collection buffer 310 along with a buffer toggle 311 to toggle between the first and second data collection buffers 309 and 310. A buffer overflow detection unit 312 and a put-away data multiplexer 313 are also provided. Additional information regarding the buffers 309 and 310 will be discussed below with reference to FIGS. 5 through 7.

According to an embodiment of the present invention, a plurality of collection points 302 are provided in either an L3 cache or L4 cache pipeline, or on an interface of one or more of the processor cores or on an I/O hub. These collection points 302 are programmable so that they can be enabled at any given time to capture diagnostic data as desired via data collection enable latches 301. The diagnostic data collection station 300 prioritizes requests from each active collection point 302 via the collection gather request priority selector 306. According to an embodiment of the present invention, when one or more types of collection points 302 are enabled and are presenting data for collection to the diagnostic data collection station 300, the different types of collection points 302 are ranked based on priority by the collection gather request priority station 306. For example, the collection points 302 at the processors may be processed first. According to an embodiment of the present invention, requests within a particular collection point 302 are generally presented to the diagnostic data collection station 300 in the order they arrived in the pipeline or on the interface containing the enabled collection station 302.

According to an embodiment of the present invention, on any given chip 104 (as depicted in FIG. 2), there may be a set of collection points 302. Each collection point 302 has an enable signal 301 associated therewith. When enabled, a respective collection point 302 may capture diagnostic data at its respective location and send it to a collection station 300. This information is then sent to the collection gather request multiplexer 304, where the selection lines are driven from the collection gather request priority station 306, and then forwarded for processing into the diagnostic data packet format required for future analysis via the diagnostic data packet formation logic 305. Once the packet has been formatted for analysis the data packet is temporarily written into either of the first or second data collection buffers 309 and 310. The buffer read/write controls and address incrementor 307 and the buffer toggle 311 determines which buffer 309 or 310 to write the data to and increments the respective buffer 309 or 310 to the next address. The diagnostic data collection station 300 also detects an overflow of data with the buffers 309 and 310 via the buffer overflow detector 312. If an overflow of data exists within each buffer 309 and 310, an overflow indication bit is set and any new data will be dropped until the read of the respective buffer 309 or 310 frees up space for new collection.

The line accumulation detection logic 308 monitors the amount of data written into the buffers 309 and 310. Once the line accumulation detection logic 308 determines that a full line of data has been accumulated in the buffer e.g., one line is thirty-two (32) data packets, the line accumulation logic 308 will trigger the data put-away sequence state machine 314 to move from the idle state and initiate the sequence to store the line to physical memory. The state machine 314 triggers data put-away request generator 315 to generates a request to put-away the data to central pipe priority logic 317. This request is then sent to a multiplexer 318 at an intervening level memory (e.g., L3 cache) controller and the put-away command, along with its target physical address and other pipe fields that may be required is sent through the intervening memory (e.g., L3 Pipe C1, C2 and C3) controller pipeline 319 to the interface 320 of the higher level memory or the interface 321 of the main memory.

The physical memory line address increment logic 316 within the diagnostic data collection station 300 holds and increments the target physical memory address for each subsequent line of diagnostic data packets. On each chip that contains a diagnostic data collection station 300, there also exists a bank of latches containing the physical memory diagnostic data locations 303 where the diagnostic data is to be stored for analysis. These locations are set up via software means for example, the address range is indicated by providing a start and an end physical address of memory that is allocated solely for the purpose of storing this diagnostic data.

The address range is programmable, but is always set up to map to the closest possible physical memory to the diagnostic data collection station 300. That is, if possible, the address range selected maps to physical memory located on the same physical chip 104 as the diagnostic data collection station 300. If this is not possible (for example, because the collection station is on a processor chip 104 that does not have a direct connection to a memory port 105, or if the collection station is on an L4 chip) then software maps the target physical memory to the local node 101. Target physical memory is not mapped off-node for diagnostic data collection therefore the high bandwidth system fabric busses 102 are not used for diagnostic data put-away, thereby minimizing the effect of diagnostic data collection on system performance.

The physical memory line address incrementor 316 will present the start address provided by the physical diagnostic data location latches 303 to the central priority multiplexor 318 for the first accumulated line in the data buffers 309, 310. When the central priority logic 317 grants the request, the data put-away sequence state machine 314 will complete the data put-away sequence and the physical memory line address increment logic 316 will increment the physical address latch value to point to the next physical line in the target storage, in preparation for the next accumulated line put-away.

At the time of the grant from the central priority logic 317, the accumulated line of data is transferred from buffer 309 or 310 through a put-away data multiplexer 313 (selected by the buffer toggle 311) to an interface 320 of a higher level memory (e.g., L4 cache) or to an interface 321 of main memory.

The process continues as each line is accumulated. The memory line address increment logic 316 also includes logic to check that the end of the physical address range has not been reached by comparing the current address with the stop address provided by software and stored in the physical memory diagnostic data location latches 303. If the end of the physical address range is reached, the hardware will disable further collection by resetting the collection point enable latches 301. These latches will remain disabled until software re-enables them, at which point the physical address latch in the physical address increment logic 316 is reset to the start address provided by the physical memory diagnostic data location latches 303. This implies to the hardware that the previously collected data has undergone analysis and the software is ready to collect new data.

Figure 4:
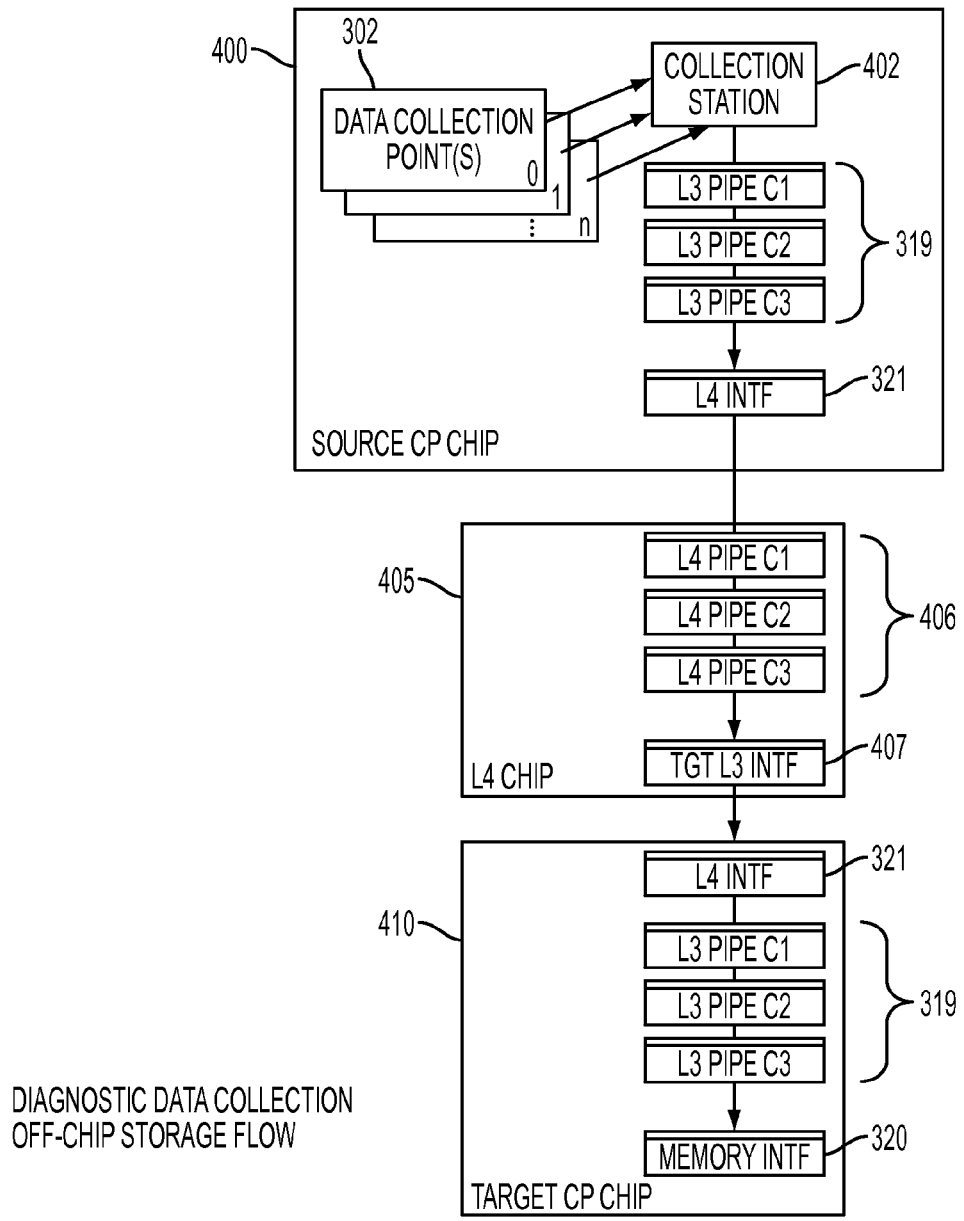
FIG. 4 is a block diagram illustrating off chip storage flow of collected diagnostic data that can be implemented within embodiments of the present invention.

FIG. 4 is a block diagram illustrating off-chip storage flow of collected diagnostic data that can be implemented within embodiments of the present invention. In one embodiment, if the target memory is on the source chip 400, that is the chip where the data collection points 302 are disposed, then the memory is accessed on the respective chip 400. However, in some cases the target memory is not on the source chip. FIG. 4 illustrates a case where the target memory is not on the source chip 400. As shown in FIG. 4, the diagnostic data is collected via a data collection station 402 from collection points 302 located on the source chip 400. The data is then routed to a target memory at a target chip 410 via a higher level memory chip (e.g., L4 chip) 405. The data is routed through the interface 321 to the L4 chip 405, then via the L4 pipe cycles C1, C2, C3, 406 to an interface 407 of the target chip 410. Then the data is routed through interface 321 of the target chip 410 and the put-away command is sent via the L3 pipe cycles C1, C2, C3, 319 to target memory interface 320.

Figure 5:
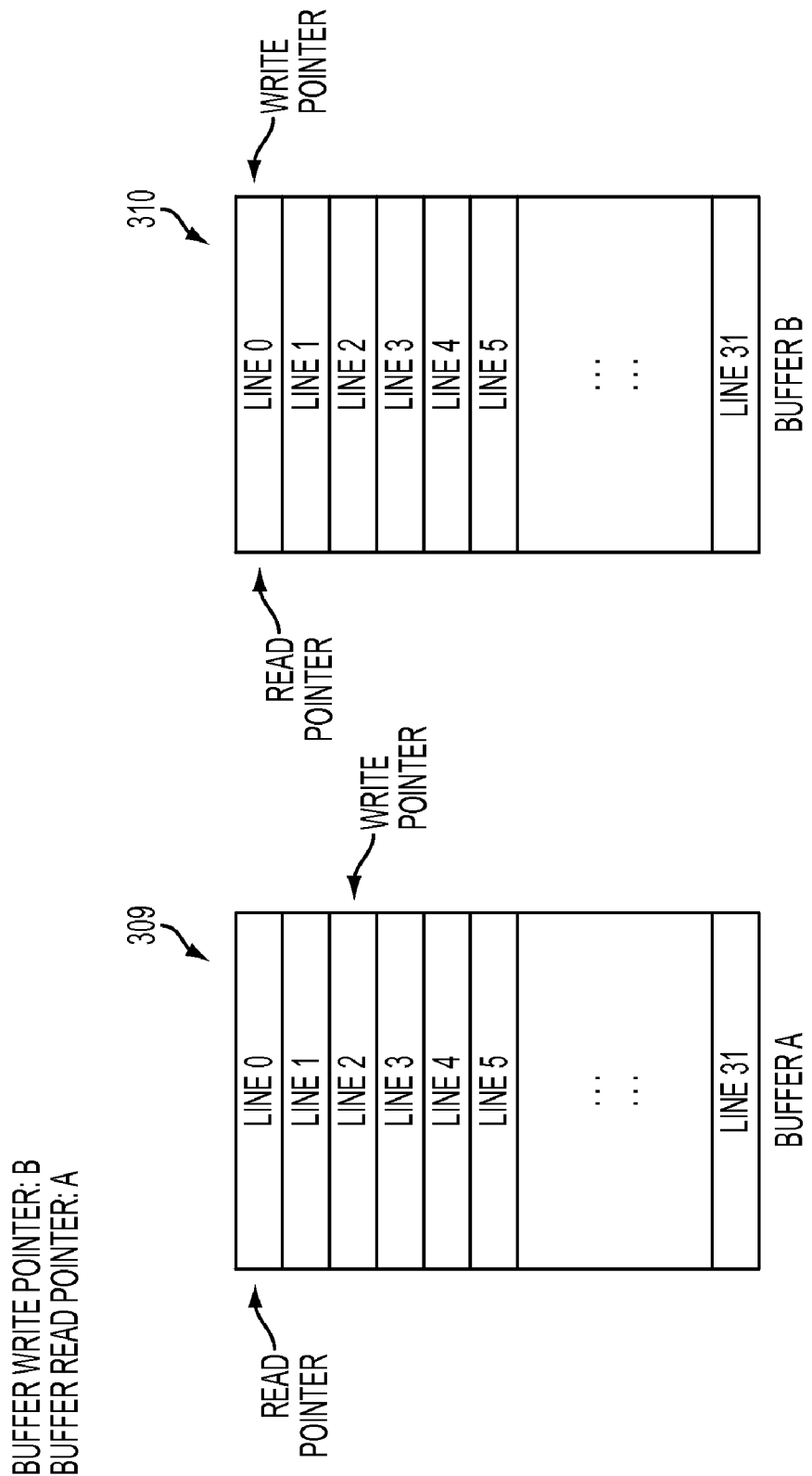
FIGS. 5 through 7 are block diagrams illustrating a management method of memory buffers of the diagnostic data collection station shown in FIG. 3 that can be implemented within embodiments of the present invention.
Figure 6:
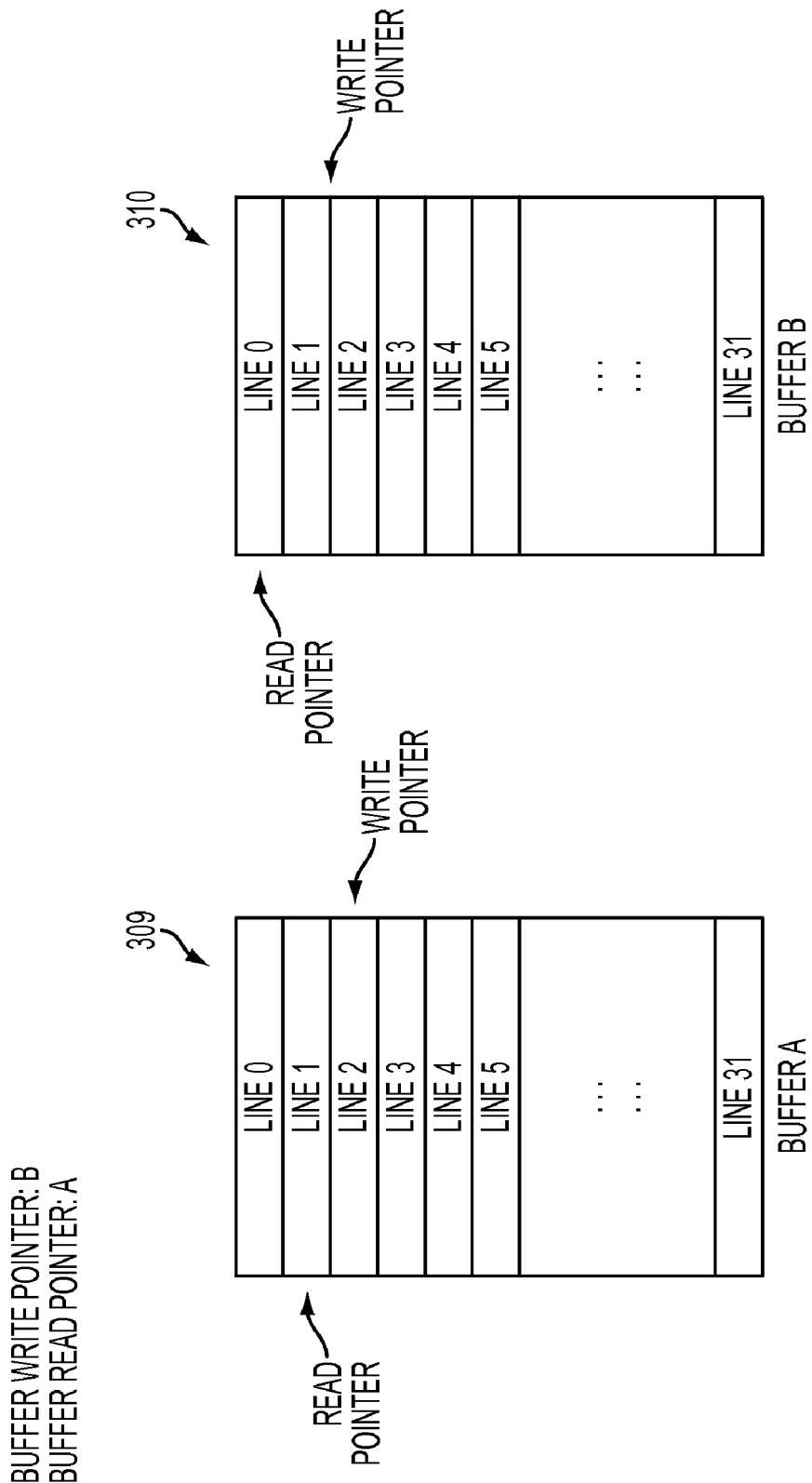
Figure 7:
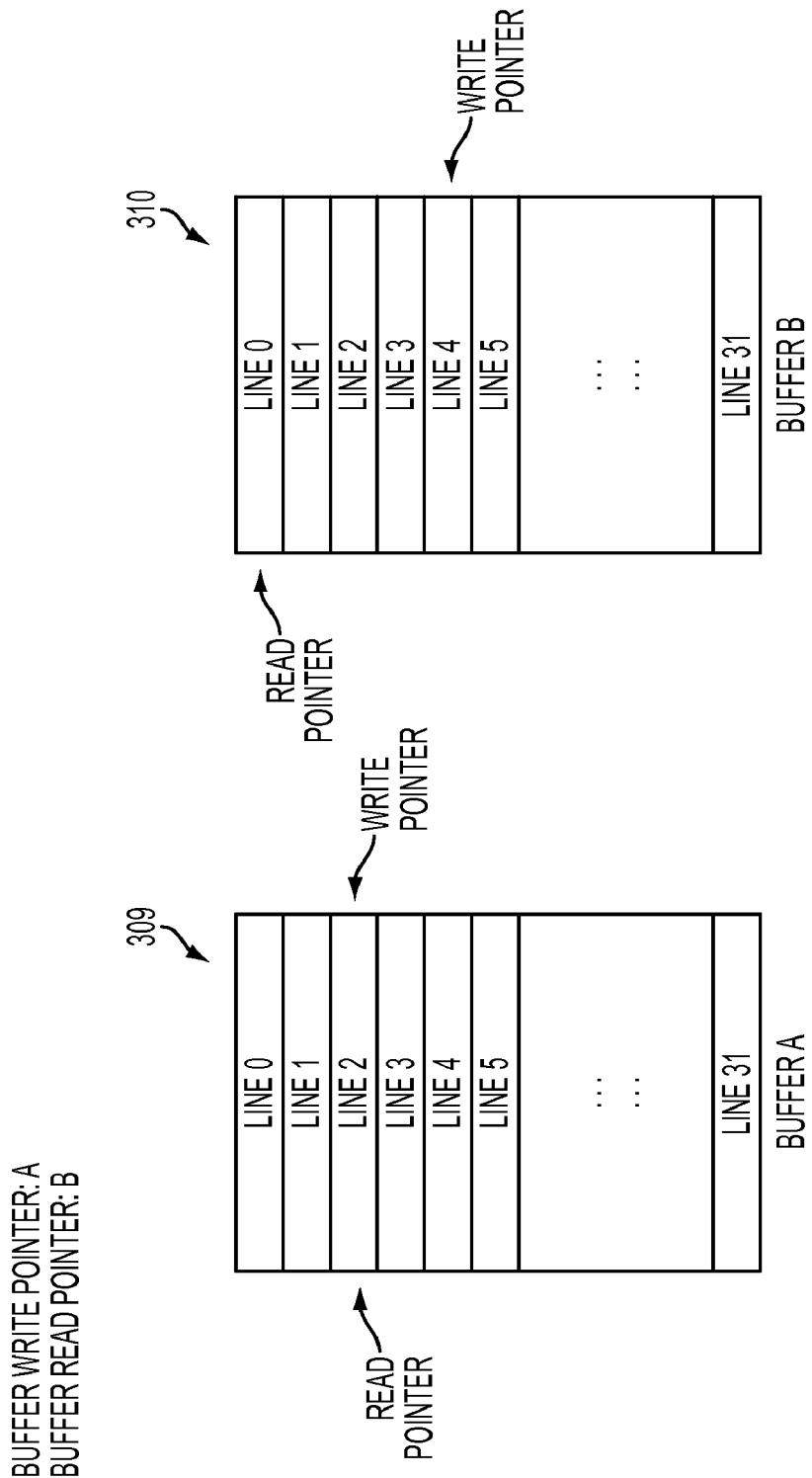

FIGS. 5 through 7 are block diagrams illustrating a management method of memory buffers of the diagnostic data collection station shown in FIG. 3 that can be implemented within embodiments of the present invention. As shown in FIG. 5, the data collection station (as depicted in FIG. 3) selectively reads and writes the diagnostic data between the plurality of buffers 309 and 310 by alternatively writing diagnostic data to at least one line address of a first buffer 309 and reading diagnostic data from at least one line address of a second buffer 310, for example. According to an embodiment of the present invention, as soon as a full line of data in the first buffer 309 is stored the write pointer switches to the second buffer 310 as shown in FIG. 5. As shown, a buffer read pointer is pointing to line '0' of first buffer 309 with both lines '0' and '1' having been written in the first buffer 309. While the first buffer 309 is being read, the write pointer is now pointing to line '0' of the second buffer 310. Each buffer 309 and 310 is able to read and write 32 lines of data. The buffers 309 and 310 are toggled via the buffer toggle 311 (as depicted in FIG. 3).

As shown in FIG. 6, the writes continue uninterrupted to the second buffer 310 until another full line of data is accumulated. The diagnostic data collection station 300 then checks to see if the line read has completed for the first buffer 309. If so, the write pointer moves back to the first buffer 309. If not, the write pointer continues to select the second buffer 310. As shown in FIG. 6, the read pointer is now pointing to the next line in the first buffer 309 (i.e., line '1') and the write pointer stops at line '2' after writing line '0' and line '1' of the second buffer 310. According to an embodiment of the present invention, the data collection continues uninterrupted.

As shown in FIG. 7, the read pointer is now pointing to line '2' of the buffer 309 after writing to line '4' of the buffer 310. And the read pointer is now pointing to line '0' of buffer 310 to read lines '0' through '3' of the buffer 310. That is, as shown in FIG. 7, the write pointer returns to the first buffer 309 to allow the second buffer 310 an opportunity to store the data it has accumulated.

Figure 8:
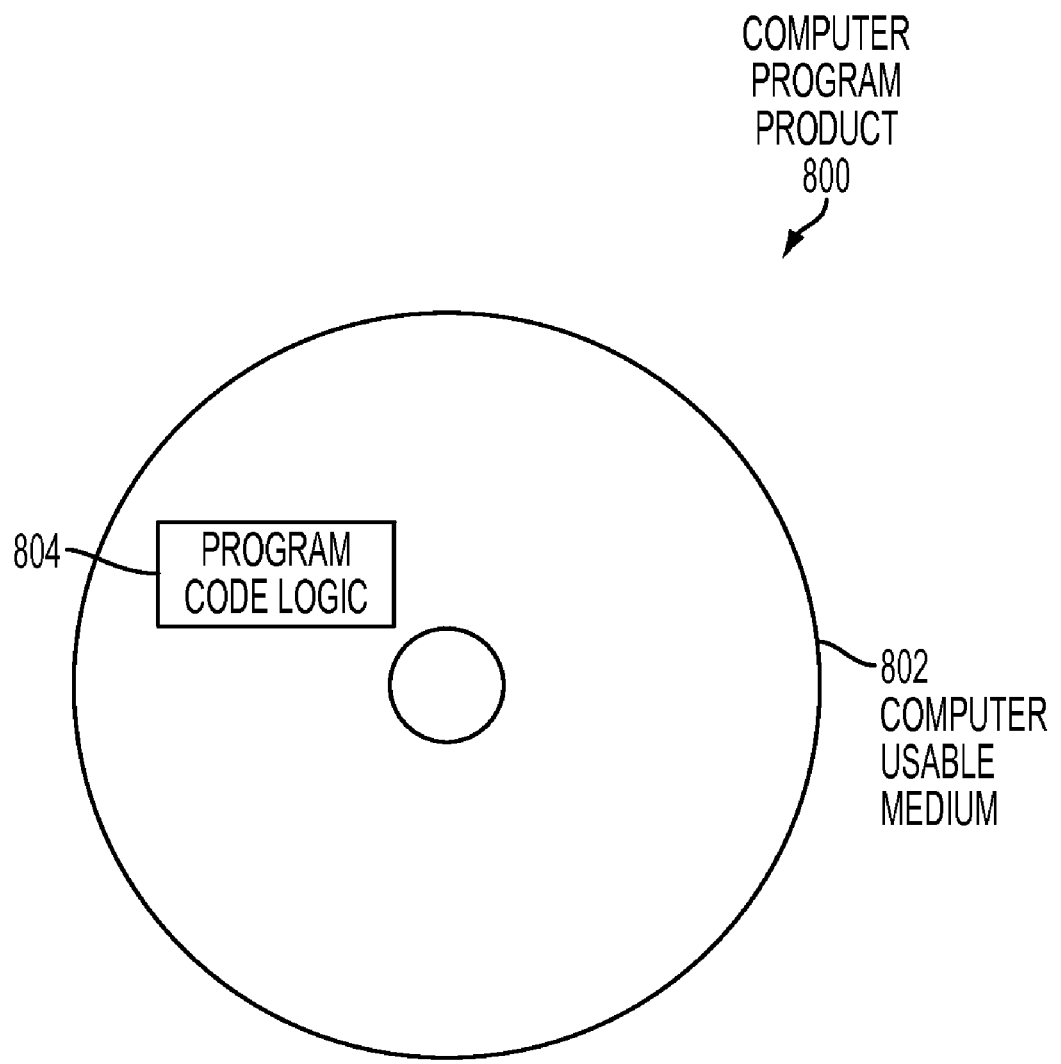
FIG. 8 is a diagram illustrating a computer program product that can be implemented within embodiments of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 800 as depicted in FIG. 8 on a computer usable medium 802 with computer program code logic 804 containing instructions embodied in tangible media as an article of manufacture. Exemplary articles of manufacture for computer usable medium 802 may include floppy diskettes, CD-ROMs, hard drives, universal serial bus (USB) flash drives, or any other computer-readable storage medium, wherein, when the computer program code logic 804 is loaded into and executed by a computer, the computer becomes an apparatus for practicing the invention. Embodiments include computer program code logic 804, for example, whether stored in a storage medium, loaded into and/or executed by a computer, or transmitted over some transmission medium, such as over electrical wiring or cabling, through fiber optics, or via electromagnetic radiation, wherein, when the computer program code logic 804 is loaded into and executed by a computer, the computer becomes an apparatus for practicing the invention. When implemented on a general-purpose microprocessor, the computer program code logic 804 segments configure the microprocessor to create specific logic circuits.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The flowcharts can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for collecting diagnostic data within a multiprocessor system, the method comprising:
   capturing diagnostic data via a plurality of collection points disposed at a source location within the multiprocessor system;
   routing the captured diagnostic data to a data collection station at the source location, the data collection station comprising a plurality of buffers, wherein each of the buffers is configurable to receive data or to be read, wherein one of the buffers is configured to receive the captured diagnostic data routed to the collection station;
   storing the received captured diagnostic data in a first block of the one of the buffers;

based on the first block being filled with the received captured diagnostic data, configuring the one of the buffers to be read and another of the buffers to receive data; and based on the one of the buffers being configured to be read, transferring the received captured diagnostic data from the one of the buffers to any one of a target storage location on a same chip as the source location or another storage location on a same node.

2. The computer-implemented method of claim 1, wherein the collection points are disposed at a processor interface or an I/O hub interface.

3. The computer-implemented method of claim 1, further comprising:

prioritizing requests from each of the collection points of the plurality of collection points based on ranking.

4. The computer-implemented method of claim 1, wherein the collection points are programmable.

5. The computer-implemented method of claim 1, further comprising:

determining which buffer of the plurality of buffers to write the received captured diagnostic data by toggling between the plurality of buffers;

incrementing an address of a respective buffer to a next address once the received captured diagnostic data has been written to the address; and formatting the captured diagnostic data into line-sized data packets before being temporarily stored in one of the plurality of buffers.

6. The computer-implemented method of claim 5, further comprising:

determining whether an overflow of diagnostic data exists; and preventing any other buffer writes until reads of a respective buffer free up space in the respective buffer.

7. The computer-implemented method of claim 5, further comprising:

selectively reading and writing the received captured diagnostic data between the plurality of buffers by alternatively writing the received captured diagnostic data to at least one line address of a first buffer and reading the received captured diagnostic data from at least one line address of a second buffer.

8. The computer-implemented method of claim 5, further comprising:

selectively holding and incrementing a target physical memory address for each line of the data packets;

providing a memory diagnostic data locations for the diagnostic data to be stored for analysis and setting a start physical address and a stop physical address of memory for storing the diagnostic data;

incrementing a physical address of memory after each line of diagnostic data is stored; and determining whether the stop physical address has been reached by comparing a current physical address of memory to the stop physical address, and resetting the start physical address when the stop physical address has been reached.

9. The computer-implemented method of claim 1, further comprising:

storing the received captured diagnostic data in a first line of the another of the buffers, based on the configuring the one of the buffers to be read and the another of the buffers to receive data;

monitoring for completion of the storing of the received captured diagnostic data in the first line of the another of the buffers;

advancing to a next line of the another of the buffers to receive data based on determining that the storing of the received captured diagnostic data in the first line of the another of the buffers has completed and reading of the one of the buffers has not completed; and based on determining that the storing of the received captured diagnostic data in the another of the buffers has completed and the reading of the one of the buffers has completed, configuring the one of the buffers to receive data and the another of the buffers to be read.

10. A computer-program product comprising a tangible storage medium readable by a processing circuit and storing instructions for execution by the processing circuit for performing a method for collecting diagnostic data within a multiprocessor system, the method comprising:

capturing diagnostic data via a plurality of collection points disposed at a source location within the multiprocessor system;

routing the captured diagnostic data to a data collection station at the source location, the data collection station comprising a plurality of buffers, wherein each of the buffers is configurable to receive data or to be read, wherein one of the buffers is configured to receive the captured diagnostic data routed to the collection station;

storing the received captured diagnostic data in a first block of the one of the buffers;

based on the first block being filled with the received captured diagnostic data, configuring the one of the buffers to be read and another of the buffers to receive data; and based on the one of the buffers being configured to be read, transferring the received captured diagnostic data from the one of the buffers to any one of a target storage location on a same chip as the source location or another storage location on a same node.

11. The computer-program product of claim 10, wherein the collection points are disposed at a processor interface or an I/O hub interface.

12. The computer-program product of claim 10, wherein the method further comprises:

prioritizing requests from each of the collection points of the plurality of collection points based on ranking.

13. The computer-program product of claim 10, wherein the collection points are programmable.

14. The computer-program product of claim 10, wherein the method further comprises:

determining which buffer of the plurality of buffers to write the received captured diagnostic data by toggling between the plurality of buffers;

incrementing an address of a respective buffer to a next address once the received captured diagnostic data has been written to the address; and formatting the captured diagnostic data into data packets before being temporarily stored in one of the plurality of buffers.

15. The computer-program product of claim 14, wherein the method further comprises:

determining whether an overflow of diagnostic data exists; and preventing any other buffer writes until reads of a respective buffer free up space in the respective buffer.

16. The computer-program product of claim 14, wherein the method further comprises:

selectively reading and writing the received captured diagnostic data between the plurality of buffers by alternatively writing the received captured diagnostic data to at least one line address of a first buffer and reading the received captured diagnostic data from at least one line address of a second buffer.

17. The computer-program product of claim 14, wherein the method further comprises:
   selectively holding and incrementing a target physical memory address for each line of the data packets;
   providing a memory diagnostic data locations for the diagnostic data to be stored for analysis and setting a start physical address and a stop physical address of memory for storing the diagnostic data;
   incrementing a physical address of memory after each line of diagnostic data is stored; and
   determining whether the stop physical address has been reached by comparing a current physical address of memory to the stop physical address, and resetting the start physical address when the stop physical address has been reached.

18. The computer-program product of claim 10, wherein the method further comprises:
   storing the received captured diagnostic data in a first line of the another of the buffers, based on the configuring the one of the buffers to be read and the another of the buffers to receive data;
   monitoring for completion of the storing of the received captured diagnostic data in the first line of the another of the buffers;
   advancing to a next line of the another of the buffers to receive data based on determining that the storing of the received captured diagnostic data in the first line of the another of the buffers has completed and reading of the one of the buffers has not completed; and
   based on determining that the storing of the received captured diagnostic data in the another of the buffers has completed and the reading of the one of the buffers has completed, configuring the one of the buffers to receive data and the another of the buffers to be read.

19. A system comprising:
   a plurality of nodes, each comprising a plurality of chips;
   a plurality of collection points disposed at a source location and configured to receive diagnostic data;
   at least one data collection station configured to receive the diagnostic data from at least one of the plurality of collection points and comprising a plurality of buffers wherein each of the buffers is configurable to receive data or to be read, wherein one of the buffers is configured to receive the captured diagnostic data routed to the collection station, wherein the data collection station is further configured to;
   store the received captured diagnostic data in a first block of the one of the buffers;
   based on the first block being filled with the received captured diagnostic data, configure the one of the buffers to be read and another of the buffers to receive data; and
   based on the one of the buffers being configured to be read, transfer the received captured diagnostic data from the one of the buffers to any one of a target storage location on a same chip as the source location or another storage location on a same node.

20. The system of claim 19, wherein the collection points are disposed at a processor interface or an I/O hub interface.

21. The system of claim 19, wherein the data collection station is further configured to:
   prioritize requests from each of the collection points of the plurality of collection points based on ranking.

22. The system of claim 19, wherein the collection points are programmable.

23. The system of claim 19, wherein the data collection station is further configured to:
   determine which buffer of the plurality of buffers to write the received captured diagnostic data by toggling between the plurality of buffers;
   increment an address of a respective buffer to a next address once the received captured diagnostic data has been written to the address; and
   format the captured diagnostic data into data packets before being temporarily stored in one of the plurality of buffers.

24. The system of claim 23, wherein the data collection station is further configured to:
   determine whether an overflow of diagnostic data exists; and
   preventing any other buffer writes until reads of a respective buffer free up space in the respective buffer.

25. The system of claim 23, wherein the data collection station is further configured to:
   selectively read and write the received captured diagnostic data between the plurality of buffers by alternatively writing the received captured diagnostic data to at least one line address of a first buffer and reading the received captured diagnostic data from at least one line address of a second buffer.

26. The system of claim 23, wherein the data collection station is further configured to:
   selectively hold and increment a target physical memory address for each line of the data packets;
   receive memory diagnostic data locations for the diagnostic data to be stored for analysis and receive a start physical address and a stop physical address of memory preset for storing the diagnostic data;
   increment a physical address of memory after each line of diagnostic data is stored; and
   determine whether the stop physical address has been reached by comparing a current physical address of memory to the stop physical address, and reset the start physical address when the stop physical address has been reached.

27. The system of claim 19, wherein the data collection station is further configured to:
   store the received captured diagnostic data in a first line of the another of the buffers, based on the one of the buffers being configured to be read and the another of the buffers to receive data;
   monitor for completion of the store of the received captured diagnostic data in the first line of the another of the buffers;
   advance to a next line of the another of the buffers to receive data based on a determination that the store of the received captured diagnostic data in the first line of the another of the buffers has completed and a read of the one of the buffers has not completed; and
   based on the determination that the store of the received captured diagnostic data in the another of the buffers has completed and the read of the one of the buffers has completed, configure the one of the buffers to receive data and the another of the buffers to be read.

* * * * *